United States Patent
Dutt et al.

(10) Patent No.: US 7,765,532 B2
(45) Date of Patent: *Jul. 27, 2010

(54) INDUCING CONCURRENCY IN SOFTWARE CODE

(75) Inventors: Bala Dutt, Bangalore (IN); Ajay Kumar, Bangalore (IN); Hanumantha R. Susarla, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 2258 days.

This patent is subject to a terminal disclaimer.

(21) Appl. No.: 10/277,503

(22) Filed: Oct. 22, 2002

(65) Prior Publication Data

US 2004/0078779 A1 Apr. 22, 2004

(51) Int. Cl.
G06F 9/45 (2006.01)
G06F 9/44 (2006.01)

(52) U.S. Cl. .......... 717/149; 717/110; 717/114
(58) Field of Classification Search ......... 717/140–167, 717/124–135; 711/158, 168
See application file for complete search history.

(56) References Cited

U.S. PATENT DOCUMENTS

| | | | |
|---|---|---|---|
| 5,136,705 A | 8/1992 | Stubbs et al. | |
| 5,151,991 A * | 9/1992 | Iwasawa et al. | 395/700 |
| 5,230,053 A | 7/1993 | Zaiki | |
| 5,535,393 A * | 7/1996 | Reeve et al. | 395/700 |
| 5,598,561 A * | 1/1997 | Funaki | 717/149 |
| 5,768,594 A * | 6/1998 | Blelloch et al. | 717/149 |
| 5,894,576 A | 4/1999 | Bharadwaj | |
| 5,946,487 A * | 8/1999 | Dangelo | 717/148 |
| 6,110,226 A * | 8/2000 | Bothner | 717/153 |
| 6,272,517 B1 | 8/2001 | Yue et al. | |
| 6,292,822 B1 * | 9/2001 | Hardwick | 718/105 |
| 6,324,687 B1 * | 11/2001 | Beadle et al. | 717/148 |
| 6,434,590 B1 * | 8/2002 | Blelloch et al. | 718/102 |
| 6,574,725 B1 | 6/2003 | Kranich et al. | |

(Continued)

OTHER PUBLICATIONS

Keeton, Cavaness, Friesen "Special Edition Using Java 2 Standard Edition" Dec. 27, 2000, Que, ch. 1, 4 and 7. As downloaded from ProQuest Jul. 27, 2006 (http://proquest.safaribooksonline.com/?x=1&mode=section&sortKey=title&sortOrder=asc&view=&xmlid=0-7897-2468-5&k=20&g=&catid=itbooks.prog.java&s=1&b=1&f=1&t=1&c=1&u=1&r=&o=1&n=1&d=1&p=1&a=0).*

(Continued)

*Primary Examiner*—Jason Mitchell
(74) *Attorney, Agent, or Firm*—Robert C Kowert; Meyertons, Hood, Kivlin, Kowert & Goetzel, P.C.

(57) ABSTRACT

An Induced Multi-threading (IMT) framework may be configured to induce multi-threaded execution in software code. In one embodiment, the IMT framework may include a concurrent code generator configured to receive marked code having one or more blocks of code marked for concurrent execution. Software code initially intended for sequential execution may have been automatically marked by an automated code marker and/or marked manually to generate the marked code. The concurrent code generator may be configured to generate concurrent code from the marked code. The concurrent code may include one or more tasks configured for concurrent execution in place of the one or more marked blocks of code. In one embodiment, the IMT framework may also include a scheduler configured to schedule one or more of the tasks for multi-threaded execution.

33 Claims, 10 Drawing Sheets

U.S. PATENT DOCUMENTS

| | | | | |
|---|---|---|---|---|
| 6,622,301 B1 | * | 9/2003 | Hirooka et al. | 717/149 |
| 6,675,375 B1 | * | 1/2004 | Czajkowski | 717/151 |
| 6,708,331 B1 | * | 3/2004 | Schwartz | 717/160 |
| 6,742,083 B1 | | 5/2004 | Grecar | |
| 6,779,114 B1 | * | 8/2004 | Chow et al. | 713/189 |
| 6,813,766 B2 | | 11/2004 | Hay | |
| 6,817,013 B2 | * | 11/2004 | Tabata et al. | 717/151 |
| 6,832,214 B1 | * | 12/2004 | Nguyen | 706/15 |
| 2002/0095665 A1 | | 7/2002 | Chaudhry et al. | |
| 2002/0095666 A1 | * | 7/2002 | Tabata et al. | 717/149 |
| 2002/0104077 A1 | * | 8/2002 | Charnell et al. | 717/158 |
| 2002/0147855 A1 | * | 10/2002 | Lu | 709/310 |
| 2004/0078420 A1 | * | 4/2004 | Marrow et al. | 717/174 |
| 2004/0078538 A1 | | 4/2004 | Dutt et al. | |
| 2004/0078780 A1 | | 4/2004 | Dutt et al. | |
| 2004/0078785 A1 | | 4/2004 | Dutt et al. | |

OTHER PUBLICATIONS

Hsu et al., Highly Concurrent Scalar Processing, IEEE, 1986, (pp. 386-395).

* cited by examiner

INDUCING CONCURRENCY IN SOFTWARE CODE

BACKGROUND

1. Field of the Invention

This invention relates to computer systems, and more particularly to concurrent execution of software code.

2. Description of the Related Art

Developers often implement distributed transactional applications as part of commercial and non-commercial business solutions for an enterprise. For example, a company may leverage use of an enterprise application that includes various databases distributed across multiple computers. The time spent to complete operations for the application, such as storing data in databases and manipulating data received from users, may be considerable due to high system loads and network latency (e.g., innumerable, simultaneous user requests and long waits for network communication). One technique to improve the efficiency of such applications may involve running independent operations in parallel. For example, a developer may modify application code to include threads so that some of the code (e.g., code that handles separate, independent operations) may execute concurrently. A thread may be a single sequential flow of control within an application program.

Developers may encounter various obstacles when transforming code that is intended to execute sequentially into code fragments (e.g., method, routine, function, subroutine) that may execute concurrently. For example, a particular platform such as Java™ 2 Platform, Enterprise Edition (J2EE™) may impose constraints on thread usage. J2EE uses a multi-tiered distributed component application model. Application logic may be divided into components (e.g., Java™ Servlets, JavaServer Pages™ and Enterprise JavaBeans™) according to function and the various application components may be installed on different computers depending on factors such as security, performance, etc. Although threads may be used in Java, for example, a component model such as J2EE may prevent threads from being started within the application code of a component. Thus, usage of threads as an optimization technique for an enterprise application may be limited or confined.

The typical manner of re-writing code that is intended to execute sequentially into code fragments that may execute concurrently may be burdensome for developers and counter-intuitive for readers of the code (e.g. someone maintaining the code). For example, sequential code may be split between two concurrent methods which may be contrary to what a reader of the code might expect. The relationship of logic between a caller (e.g., the code that calls a method) and the two concurrent methods may be less obvious or clear to a developer than the relationship of logic between the caller and the sequential code. Also, the methods names to be called may be very different from what would be expected or intuitive. For example, in Java, a method call may be object.start( ).

SUMMARY

An Induced Multi-threading (IMT) framework may be configured to induce multi-threading in software code. In one embodiment, the IMT framework may include a concurrent code generator configured to receive marked code having one or more blocks of code marked for concurrent execution. Software code initially intended for sequential execution may have been automatically marked by an automated code marker and/or marked manually to generate the marked code.

In one embodiment, the one or more marked blocks of code for concurrent execution may be a portion of a program method. The concurrent code generator may be configured to generate concurrent code from the marked code. The concurrent code may include one or more tasks configured for concurrent execution in place of the one or more marked blocks of code. In one embodiment, the IMT framework may also include a scheduler configured to schedule one or more of the tasks for multi-threaded execution.

In one embodiment, the concurrent code generator may be configured to perform an analysis of the marked code to estimate performance benefits of concurrent execution of the marked blocks of code. Each of the marked blocks may be analyzed. The concurrent code generator may transform a marked block into a concurrently executable task if the analysis indicates a performance benefit is estimated for concurrent execution of the marked block. Otherwise, if the analysis indicates no performance benefit for a marked block, the marked block may not be transformed. In one embodiment, the concurrent code generator may be configured to remove concurrent execution markers in the concurrent code for one or more of the marked blocks not transformed.

In one embodiment, the automated code marker may be configured as part of the IMT framework. The automated code marker may be configured to receive the sequential code, analyze the sequential code to identify potentially concurrently executable blocks of the sequential code and insert markers into the sequential code to suggest the identified blocks for concurrent execution. Static method calls may be used to implement the markers. The scheduler may be configured to schedule one of the tasks for multi-threaded execution according to priority information included with the marker for the corresponding marked block. The scheduler may also be configured to schedule one of the tasks for multi-threaded execution according to dependency and/or execution duration information included with the marker for the corresponding marked block.

In one embodiment, the framework may also be configured to include a thread pool manager to manage a thread pool that provides threads for multi-threaded execution of the task of the concurrent code. The scheduler may be configured to request a thread from the thread pool for each task scheduled for multi-threaded execution. In one embodiment, the framework may also be configured to include a tracking tool to log information to trace or profile execution of the tasks.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
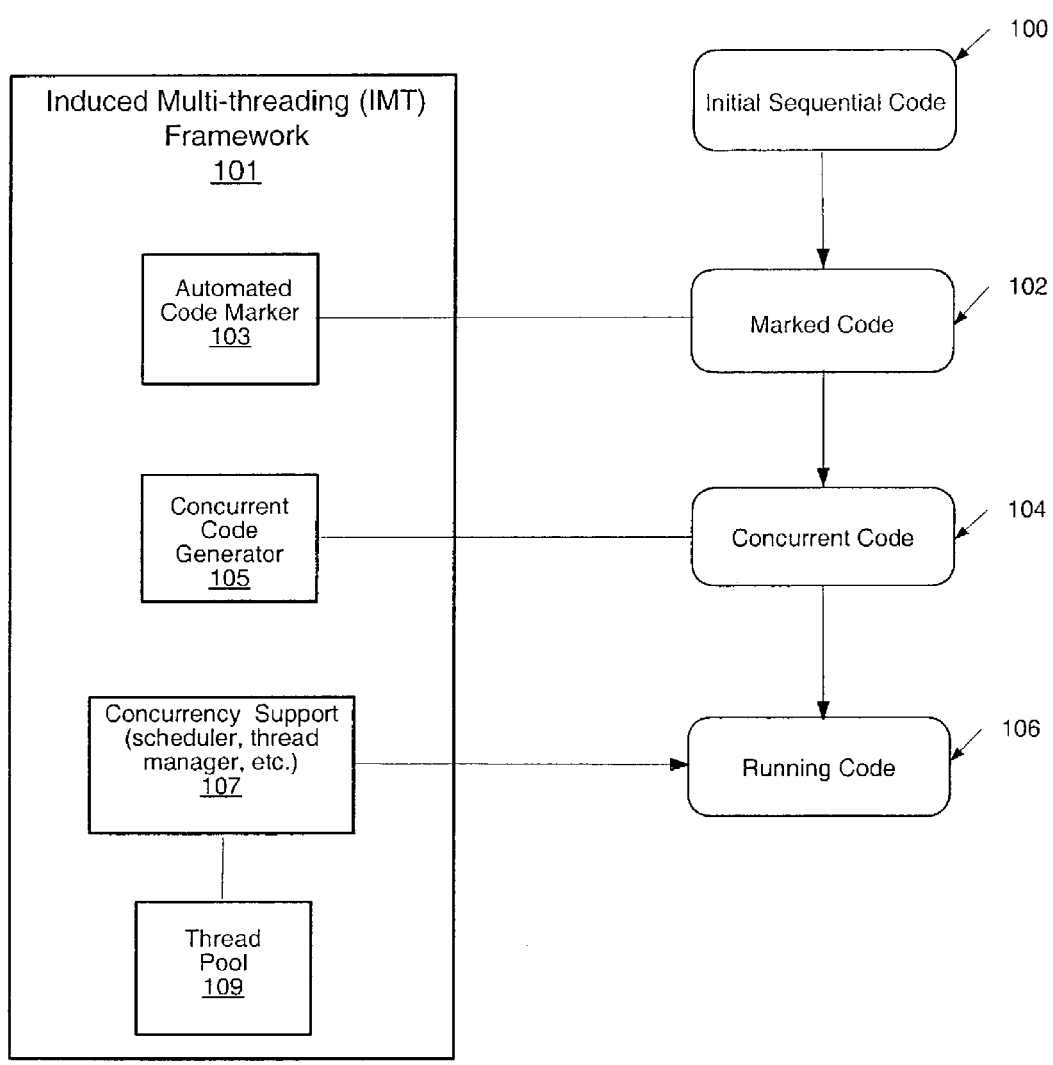
FIG. 1 illustrates one embodiment of an Induced Multi-threading (IMT) framework for inducing multi-threading in software code.

FIG. 1 illustrates one embodiment of an Induced Multi-threading (IMT) framework 101 configured to induce multi-threading in software code. The framework 101 may include an automated code marker 103, a concurrent code generator 105, concurrency support (e.g., a scheduler, thread manager, etc.) 107 and a thread pool 109. The framework 101 may enable a developer, for example, to specify portions of software code for concurrent execution. Embodiments of the IMT framework 101 may address the specification, generation and run-time behavior of the software code. For example, software code may be developed (e.g., specify portions of the code for concurrent execution), compiled and scheduled for execution with one embodiment of the framework 101. In one embodiment, configured as part of an application server, for example, the framework 101 may be configured to manage the execution of application components that operate across different computers which may be based on different platforms and architectures. In other embodiments, configured as a software application, for example, the IMT framework 101 may be configured to operate on a single computer to run and manage software code that specifies portions of the software code for concurrent execution.

Embodiments of the IMT framework 101 may be utilized to improve the execution time of various types of applications or software code having portions of code that from time-to-time may be blocked from execution. One embodiment of an IMT framework 101 may be used to induce multi-threaded execution of portions of Java 2 Enterprise Edition (J2EE) software code for an Internet-based application, for example, having portions of code that may encounter delays while waiting on completion of events. The Internet-based application may be based on a three-tier architecture and may contain code segments that may be blocked from execution until some other operation outside the scope of a host, or outside the scope of a processor within the host, completes. For example, an application component operating in a middle tier may contain code segments that may be blocked from execution until a database transaction operating in a backend tier completes. The Internet-based application may wait for communication to occur over a network. For example, network latency and/or processing of an operation on a different host (e.g., operation involving a legacy system in the backend tier) may delay communication between application components. The application may wait for a user's input (e.g., via a Web browser) or other input from a device such as an input/output (I/O) device (e.g., storage device used by the legacy system). Using the IMT framework, portions of the Internet-based application, for example, may be configured to induce concurrent execution of certain blocks of code, such as tasks that are independent of other tasks that may cause delays.

An Internet-based application operating across tiers typically has considerable potential for delays. Software code developed and relying on various embodiments of the IMT framework 101 may involve different types of software code than an Internet-based application. For example, a software program for a client-server application may be developed and executed with the IMT framework 101. A simple program configured with non-blocking code segments (e.g., assigning a value to two different variables) may still benefit from concurrent execution and may be modified to specify multiple blocks of code for concurrent execution, e.g. to take advantage of a computer configured with multiple processors. Each specified block of the program may run concurrently and may each rely on a different processor of a multi-CPU computer, for example. Thus, true multi-threading may be achieved by executing each thread with a different processor and each portion of code may execute faster.

Embodiments of the IMT framework 101 may be used to transform initial sequential code 100 into running code 106 configured for concurrent execution. Different stages of the software code are illustrated in FIG. 1 as code 100 to code 106. The initial sequential code 100 may be for an application, for example, configured for sequential execution. The initial sequential code 100 may include one or more code fragments (e.g., methods, procedures, subroutines, functions) or blocks of code. As dictated by processing of sequential code, each of the code fragments of sequential code 100 may be configured to execute one after another instead of concurrently. The sequential code 100 may be developed with various types of compiled and/or interpreted programming languages such as C++, Ada, Lisp and Java. An integrated development environment (e.g., Metrowerks CodeWarrior™, Microsoft Visual C++®, Sun™ ONE Studio) may be used to automatically generate some or all of the sequential code 100. In other cases, a developer, for example, may use various frameworks to develop sequential code 100. For example, several developers may use J2EE from Sun Microsystems, Core Services Framework (CSP) from Hewlett Packard, Sun™ ONE Framework from Sun Microsystems, NET Framework from Microsoft or some other framework to develop sequential code 100.

The following describes a code snippet of an exemplary initial sequential code 100. The code snippet may be a portion of sequential code for an Internet-based application, for example, or sequential code for some other type of application or purpose. The exemplary sequential code may be configured to enable new users to register for continued access to the application by creating new user accounts for each of the new users. For example, a new user of the application may input a login name, password and email address via a Web browser and the login name, password and email address may be used to create a new user account for the new user. After successfully registering, the new user may continue to access the application without repeating a registration process. The code snippet of a portion (e.g., excluding exception handling and other functionality) of an exemplary initial sequential code 100 may be specified with Java and may be configured as follows.

```
class AccountManager{
    public void createNewAccount(String login, String passwd,
    String address) {
        // do operation on Database 1
            DataSource ds=ctx.lookup("passwdDataSource");
            java.sql.Connection con=ds.getConnection( );
            java.sql.Statement stmt=con.createStatement( );
            java.sql.Resultset res=stmt.execute("insert into
            passwdTable values("+login+","+passwd+");");
            stmt.close( );
            con.close( );
        // do operation on Database 2
            ds=ctx.lookup("addressDataSource");
            con=ds.getConnection( );
            stmt=con.createStatement( );
            res=stmt.execute("insert into addressTable values
            ("+login+","+address+");");
            stmt.close( );
            con.close( );
    }
}
```

As part of a registration process, the sequential code 100 may be configured to receive the login, password and email address and store that received information in two different databases. Each of the database tables may be part of two different databases on separate computers due to different performance demands and criticality of each of the database tables. The separate computers may be part of a network and the sequential code 100 may be configured to operate on a different computer that is also a part of the same network. The sequential code 100 may be configured to store the login and password in a database table that may be frequently used by the application for authentication of each user. The sequential code 100 may also be configured to store the login and address in a different database table which may be minimally used by the application. For example, the different database table may be used when an administrator requests a report or requests demographical profiles for a user which may occur less frequently than authentication of users.

One embodiment of the IMT framework 101 may include a marking API (application programming interface) to identify portions of software code. The marking API may be used by a developer, for example, and/or the automated code marker 103 to embed one or more markers in software code such as the sequential code 100. After modifying software code using the marking API, the software code may be referred to as marked code 102. Markers within the marked code 102 may be used for various purposes. For example, the markers may be used to identify portions of software code that may run concurrently during execution of the software code. The markers may be used in code instrumentation. For example, the markers may demarcate specific portions of the software code so that run-time information relevant to each specific portion may be obtained during execution (e.g., profiling, tracing). In some embodiments, the markers may be used for other purposes. For example, a software program may be configured to use the markers to generate documentation for the marked code 102.

The markers may indicate potential points (e.g., blocks of code) within code fragments (e.g., methods, procedures, subroutines, functions) where multi-threading may be introduced. These potential points may be specified during initial development of the code and/or may later be specified in an existing sequential version of the code. For example, a typical use may involve a developer using the IMT framework 101 to transform a sequential version of software code to a multi-threaded version of that same software code.

The developer, for example, may use the marking API to embed extra information for the sequential code 100. The developer of the sequential code 100 may have knowledge of expected execution behavior of the sequential code 100. For example, the developer may wish to reflect which portions of the sequential code 100 are potential points for concurrent execution based on the developer's knowledge that one portion of the sequential code 100 executes independent from another portion of the sequential code 100. The developer may also use the automated code marker 103 to embed extra information for the sequential code 100. In one embodiment, the automated code marker 103 may be configured to perform an analysis of the sequential code 100 and embed markers in the sequential code based on the results of the analysis. For example, the automated code marker 103 may be configured to parse the sequential code 100, evaluate dependencies among portions of the code to identify points for potential concurrent execution and then insert markers at those points. Many variations of an analysis may be performed by the automated code marker 103 to identify potential points for concurrent execution.

In both scenarios (e.g., developer manually marks code or uses the automated code marker 103), the markers may be used and/or ignored by the IMT framework 101 since the markers represent potential points for concurrent execution. Thus, the markers may be removed and/or disregarded by the IMT framework 101 at any point after specification in marked code 102 to execution of the code. The developer or automated code marker 103 may simply embed the markers, and thus the extra information, without making assumptions about semantic behavior (e.g., properties of a run-time object) of the sequential code 100 at run-time since the markers may be used and/or disregarded.

The marking API may be used within the scope of a code fragment (e.g., methods, procedures, subroutines, functions) or block of code. In one embodiment, a method may be the unit of software code in which the markers are specified and used to potentially induce multi-threading. In other embodiments, portions of a method or sub-methods may be marked for concurrency. One or more blocks of code within one or more methods may be marked for potential concurrent execution. The same markers across different methods may be different. For example, a developer may specify blocks of code within two different methods with the marking API and the specified blocks of code may remain separate for each of the different methods. In one embodiment, the IMT framework 101 may implicitly assume a method is a block of code. The portions of code specified for concurrent execution may be less than an entire method (e.g., implicit block) of the code.

In one embodiment, the marking API may assign additional meaning to pre-existing constructs of a programming language to serve as a marker to identify blocks of code for potential concurrentization. For example, markers may be existing programming language statements such as C statements, Lisp statements and FORTRAN statements. In one embodiment, static method calls of a programming language may be used for the marking API. For example, in an object-oriented language such as Java, C++ and Smalltalk, the marking API may include static methods or data members of a class. A class may include pre-existing constructs of the programming language that belong to a class instead of to a given instance of the class. These constructs may be called static or class members. The constructs may be assigned additional meaning so that software code that includes the markers may be translated (e.g., compiled or interpreted) in the same manner as software code that excludes the markers (e.g., sequential code 100). Thus, in the absence of an IMT framework 100, marked code 102 may include pre-existing constructs of a programming language already recognized by an existing compiler, for example, for the programming language used. Thus, marked code may remain compatible with a programming language and traditionally executable even in the absence of IMT framework 100.

In one embodiment, static methods of a Java class may be used for the marking API. The following is an exemplary class and methods of the class that may be used for marking blocks of code in Java, for example. Each method may be used to specify potential points (e.g., markers around blocks of code) for concurrent execution.

```
package com.xxx.codemarker;
public class Marker{
    public static void block( ) {}
    public static void endBlock( ) {}
    public static void block(String name) {}
    public static void block(String name, int priority);
    public static void block(String name, String [ ] dependencies);
    public static void block(String name, int priority, String [ ]
        dependencies);
}
```

Each block call (e.g., block method) defined within a Marker class may be used to specify potential points for concurrency in software code such as the sequential code 100. One or more blocks of code may be identified within a method of the software code as a potential point for concurrency. A block of code may be marked by specifying a block call (e.g., block method) at the beginning of the block of code and specifying an end block (e.g., endBlock method) for that same block of code at the end of the block of code. Thus, programming statements between these two block calls may identify a block of code as a potential point for concurrent execution.

In one embodiment, the block of code may be preceded by an opening statement (e.g., curly brace) and succeeded by a closing statement (e.g., curly brace). The opening and closing statement may further identify the beginning and ending programming statements between, for example, a block and endBlock call. In other embodiments, although the opening and closing statements may improve the readability of the software code, the opening and closing statements may be excluded. In one embodiment, variable scope within a block of code may be limited to the block of code to prevent variables from being accessed across two blocks of code that may potentially execute concurrently. Arguments and local variables (if any) of the specified block of code may be used as read-only data, in which case additional optimization may be done.

A block of code may be qualified with extra information that specifies hints for execution of the block of code in relation to another block of code. As shown in the above exemplary Marker class, the Marker class may include several different block methods for specifying additional arguments. In order to mark a block of code, one of the block methods may be used to mark the beginning of a block of code and an endBlock method may be used to mark the end of the block of code. A block of code may be qualified with extra information by using an overloaded block method. For example, as shown in the above exemplary Marker class, each of the blocks of code may be assigned a specific name (e.g., String). The extra information may be used and/or disregarded during scheduling of the potential blocks of code for concurrent execution.

In one embodiment, the following guidelines describe the selection and usage of the block methods included in a class such as the exemplary class. If one block of code within a method is specified as a potential point for concurrent execution, then the block method without arguments (e.g., block ( )) may be used to indicate the block of code. For example, a developer may know that a specific portion of a method may execute independently of the remaining portion of the method, and the developer may specify the specific portion of code as a potential point for concurrent execution with the block( ) call, or as the result of a code analysis an automated code marker tool 103 may insert the block( ) at a point the tool identified for concurrentization. A method may include the one block of code that may execute concurrently with the remaining portion of the method. The opening statement of such block call may not include a specific block name or an indication of dependencies. Likewise, when the block methods are simply used to segregate blocks of code as potential points for concurrent execution, then the block method without arguments (e.g., block ( )) may be used to indicate the block of code. For example, in one embodiment, an automated code marker 103 may choose to use the block( ) call when the code marker 103 determines that qualifying a block of code with extra information (e.g., a specific name) is not necessary based on results of an analysis.

In one embodiment, a block opening statement may indicate a priority for execution of a concurrent block. Each of the blocks of code may be assigned a priority. The priority may be a thread priority in which the programming language statements of the blocks of code may be executed. Although the blocks may be marked for concurrent execution, only a limited number of threads may be available for concurrentization. Thus, a developer may include priority information with the markers to indicate certain blocks of code to be started ahead of others.

In one embodiment, each of the blocks of code may be assigned one or more dependencies on another block of code. The dependencies may indicate other blocks of code that may complete execution before a given block of code begins execution. Complex dependencies between blocks of code may be specified. In one embodiment, a block method may be used to specify dependencies over blocks of code that may be included in a later portion of a method as long as a cycle is avoided.

In one embodiment, an estimated or measured running duration (e.g., weight) of a block may be specified in the marked code. A developer, for example, may know an approximate duration for which a block of code may prevent execution of other code, so the developer may assign a weight accordingly to that block of code. In one embodiment, similar to priorities and dependencies, the weight may be used during scheduling of the potential blocks of code for concurrent execution. For example, blocks of code marked with longer execution times may be scheduled ahead of blocks with shorter execution times with a goal of the blocks all completing execution at approximately the same time.

Referring back to the code snippet of the exemplary sequential code 100, after modification and marking according to the marking API, the code snippet may be configured as follows.

```
import com.xxx.codemarker.Marker;
class AccountManager{
    public void createNewAccount(String login, String passwd, String
address){
        Marker.block("update1");
        {
          //do operation on Database 1
            DataSource ds=ctx.lookup("passwdDataSource");
            java.sql.Connection con=ds.getConnection( );
            java.sql.Statement stmt=con.createStatement( );
            java.sql.Resultset res=stmt.execute("insert into
            passwdTable values("+login+","+passwd+");");
            stmt.close( );
            con.close( );
        }
        Marker.endBlock( );
        Marker.block("update2");
        {
          //do operation on Database 2
            DataSource ds=ctx.lookup("addressDataSource");
            java.sql.Connection con=ds.getConnection( );
            java.sql.Statement stmt=con.createStatement( );
            java.sql.Resultset res=stmt.execute("insert into
            addressTable values("+login+","+address+");");
            stmt.close( );
            con.close( );
        }
        Marker.endBlock( );
    }
}
```

The exemplary sequential code 100 may have been manipulated (e.g., by a developer and/or automated code marker 103) to specify potential points for concurrent execution. Thus, two blocks of code are specified as "update1" and "update2". Some of the variables of each of the two blocks of code may have been duplicated (e.g., Resultset), for example, because the two blocks of code shared those same variables.

To further illustrate specification of dependencies between blocks of code using the marking API, the same code snippet may be manipulated to run the second block only when the first block is complete. The code snippet of an exemplary sequential code 100, after modification with the marking API, may be configured as follows.

```
import com.xxx.codemarker.Marker;
class AccountManager {
public void createNewAccount (String login, String passwd, String
address) {
    Marker.block("update1");
    {
      //do operation on Database 1
        DataSource ds=ctx.lookup("passwdDataSource");
        java.sql.Connection con=ds.getConnection( );
        java.sql.Statement stmt=con.createStatement( );
        java.sql.Resultset res=stmt.execute("insert into
        passwdTable values("+login+","+passwd+");");
        stmt.close( );
        con.close( );
    }
    Marker.endBlock( );
    Marker.block("update2", {"update1"});
    {
      //do operation on Database 2
        DataSource ds=ctx.lookup("addressDataSource");
        java.sql.Connection con=ds.getConnection( );
        java.sql.Statement stmt=con.createStatement( );
        java.sql.Resultset res=stmt.execute("insert into
        addressTable values("+login+","+address+");");
        stmt.close( );
        con.close( );
```

-continued

```
    }
    Marker.endBlock( );
  }
}
```

Use of static method calls to mark blocks of code for potential concurrent execution may be more intuitive for a developer than other forms of marking. For example, a developer may expect the execution behavior of an application to disregard comments as markers but expect static method calls to change the execution behavior of the application. In the absence of an IMT framework 101, the markers may be disregarded as empty method calls. For example, the marked code 102 may be fully compatible with an existing programming language in the absence of an IMT framework 101 that can make use of the markers. As an additional example, in the absence of the IMT framework, an optimizing Java compiler and virtual machine (VM) may remove the static method calls as empty method calls.

Use of the markers may help to hide implementation details, for example. A developer may use the marking API to identify potential points for concurrent execution, but the implementation details may be handled by the IMT framework 100. The marking API may enable a developer and/or the automated code marker 103 to mark the code fragments with minimal modification to the sequential code 100. In one embodiment, the markers may be mark-up language constructs such as eXtensible markup language (XML) and/or hypertext markup language (HTML) statements. In another embodiment, the markers may be programming language comments. For example, comments may be added to the sequential code 100 and used as markers to specify potential points for concurrent execution. In some embodiments, the markers may be entirely new constructs (e.g., data structure, programming-statement) that are unique to a programming language. For example, the markers may be symbols recognizable by a programming language that indicate potential points for concurrent execution.

In one embodiment, the IMT framework includes concurrent code generator 105. The concurrent code generator 105 may parse and modify the marked code 102 to generate concurrent code 104. In one embodiment, the concurrent code generator 105 may replace markers in the marked code 102 with other programming statements. Thus, the concurrent code generator 105 may be configured to transform marked code 102 into concurrent code 104 that induces concurrent execution of the blocks of code as initially indicated by the markers. The concurrent code 104 may include one or more tasks configured for concurrent execution in place of the one or more marked blocks of code. The concurrent code 104 may include references to shared programming language resources (e.g., dynamically linked libraries, shared objects, shared libraries, built-in code) that may provide concurrency functionality. For example, the concurrent code 104 may reference concurrency support code 107 configured to schedule each task concurrently.

In one embodiment, the concurrent code generator 105 may be configured to generate the concurrent code 104 in response to an indicated option from one or more compilers, interpreters and/or parsers, for example. Concurrent code generator 105 may be included with a compiler or pre-processor that includes an option, for example, that when specified by a user, indicates that concurrent code 104 should be generated for the specified marked code 102. In one embodiment, a separate tool may be configured to receive the marked code 102 and generate the concurrent code 104 from the marked code 102. For example, the IMT framework 101 may be configured to include a tool to generate the concurrent code 104 from the marked code 102.

In one embodiment, the concurrent code generator 105 may be configured to perform an analysis of the marked code 102 to validate different rules and/or handle different conditions before transforming the marked code 102 into concurrent code 104. The concurrent code generator may analyze the marked code and determine for each marked block of code whether or not that block should be transformed for concurrentization. For example, one block spanning over an entire method that cannot be executed in parallel with any other code would be ignored during the transformation process to reduce the overhead of scheduling the one block that is essentially still sequential. In one embodiment, even if the method includes a portion of code outside of the one block, that portion of code may be transformed only if the portion of code can execute in parallel with the one block.

The following describes other rules and/or conditions for transformation of marked code 102 into concurrent code 104, according to various embodiments. The following rules and conditions are exemplary. Many other rules and/or conditions may be handled by various embodiments of the IMT framework 101. In one embodiment, marked code 102 may include blocks of code within loops (e.g., for loops, while loops, do-while loops, etc.). For example, in marked code 102, a loop may include an index to count iterations of the loop and the loop may include one or more blocks of code marked for concurrent execution. In one embodiment, if the blocks of code (marked and unmarked) use the loop index as a read-only variable, for example, the concurrent code generator 105 may duplicate one or more independent loops for each of the one or more concurrent blocks. Each of the duplicated one or more loops may include one of the one or more concurrent blocks to help parallel loops execute more efficiently, for example.

To further illustrate handling of independent, blocks of code within a loop, a code snippet of an exemplary marked code 102 that includes a loop may be configured as follows.

```
for (int i=0;i<1000;i++) {
    Marker.Block( ) {
        a[i]=i;
    }
    Marker.endBlock( );
    Marker.Block( ) {
        b[i]=i*i;
    }
    Marker.endBlock( );
}
```

The code snippet that includes a loop may be transformed into two loops (e.g., one loop for assignment of a value to variable 'a' and another for variable 'b') within concurrent code of that same code snippet. The parallel loops may execute faster on a multi-CPU computer, for example.

In one embodiment, if an endBlock call is missing, nested concurrent blocks may be implicitly assigned. In one embodiment, for example, if an endBlock( ) call is missing from a concurrent block and a new block call is specified, the concurrent block may be assumed to be an enclosing concurrent block and thus, as directed, the new block call would be nested.

In one embodiment, concurrent code generator 105 may generate a task for each concurrent block of marked code 102. Tasks may be functions, methods or other portions of code. A task may require access to data (e.g., arguments) originally passed to a method of marked code 102 from which the task is generated. Concurrent code generator 105 may generate from the data one or more instances of variables accessible to the task. In one embodiment, a task may modify local copies of the variables instead of using the variables as read-only. If tasks do modify the variables, for example, one embodiment of the concurrent code generator 107 may assume the variables will be modified by the task for further use within the scope of the task.

In one embodiment, concurrent code generator 105 may be configured to generate concurrent code 104 based on a naming convention. For example, each concurrent block ml (corresponding to a task) may be named "Tm1" to identify the task within the block. Each task may be named Tm1_<num>, where <num> indicates a serial number of the block. Thus, tasks for ml, for example, may be named Tm1_0, Tm1_1, etc. Data (e.g., arguments) passed to each block may be named am1_<num>, where <num> indicates the serial number of the data. Other naming conventions, for example, variables used to store exceptions (e.g., a run-time error condition) initiated during execution, may be defined and used by the IMT framework 101 during transformation of marked code 102 to concurrent code 104.

In one embodiment, concurrent code generator 105 may include synchronization points (e.g., code that induces a thread to enter a wait state) in concurrent code 104. Concurrent code generator 105 may include a synchronization point to allow a method and/or code corresponding to a concurrent block to wait for completion of another task (e.g., another method, another concurrent block, a resource becoming available, etc.).

In one embodiment, concurrent code generator 105 may generate programming language code in concurrent code 104 to reference a scheduler in concurrency support code 107 to schedule each task of concurrent code 104. The scheduling may be based on information included in marked code 102. For example, concurrent code generator 105 may parse a concurrent block's opening statement of marked code 102 (e.g., as indicated with marking API). The opening statement may include a priority, weight and/or dependencies on one or more other concurrent blocks for the concurrent block. Concurrent code generator 105 may generate code in concurrent code 104 to schedule the dependencies for execution. Concurrent code generator 105 may generate code in concurrent code 104 to schedule concurrent execution for each task based on specified priorities and/or weights. For example, a task (as indicated by the marked code 102) may be scheduled to begin execution before another task.

Referring back to the code snippet of the exemplary marked code 102, the following describes and shows exemplary concurrent code 104 generated from the exemplary marked code 102. As described above, the concurrent code 104 may include references to concurrency support code 107 that may provide concurrency functionality. For example, the concurrent code 104 may include references to a scheduler configured to schedule each task concurrently. In one embodiment, one or more shared libraries may be configured to include a Task class and Scheduler class. For example, each concurrent block may be transformed into a derived class (e.g., inherited from) of Task. Each thread scheduled to execute the concurrent block may begin by executing a method class (e.g., method task of Task class is overridden by method task of derived class) associated with the derived class. The Scheduler class may be configured to schedule the task for multi-threaded execution. An exemplary Task class may be configured as the following:

```
class Task{
    private final int NOT_BEGUN =1;
    private final int BEGUN=2;
    private final int DONE=3;
    private int m_status=
    public Exception m_ex=null;
    public void task( ){}
    public Exception waitForTask( ){
        //if state is DONE just return
        //if state is NOT_BEGUN keep sleeping and waiting for the
        task to begin
        //If state is BEGUN
        synchronized(this){
            wait( );
            return m_ex;
        }
    }
}
```

The code snippet for an exemplary Scheduler class may be configured as the following:

```
class Scheduler{
    private static int m_count=0;
    private static int getNodeSNo( ){return ++m_count;}
    public static void schedule(Task t){
        int sNo=getNodeSNo( );
        //select a thread and attach to it the info about the
        node that began it
        //command thread to do the task,
    }
    public static Exception wait(Task t){
        return t.waitForTask( );
        //attach info to the thread about latest node info
    }
    ...
}
```

After transformation of the exemplary marked code 102 to exemplary concurrent code 104, the code snippet for the exemplary concurrent code 104, including references to concurrency support 107, may be configured as the following:

```
import com.xxx.concurrency.*;
class AccountManager{
    String acreateNewAccount_0=null;
    String acreateNewAccount_1=null;
    String acreateNewAccount_2=null;
    class TcreateNewAccount_update1_0 extends Task{
        public void synchronized task( ){
            try{
                //do operation on Database 1
                DataSource ds=ctx.lookup("passwdDataSource");
                java.sql.Connection con=ds.getConnection( );
                java.sql.Statement stmt=con.createStatement( );
                java.sql.Resultset res=stmt.execute("insert into passwdTable
                    values("+login+","+passwd+");");
                stmt.close( );
                con.close( );
            }
            catch(java.lang.Exception ex){
                m_ex=ex;
            }
            notifyall( );
        }
    }
    class TcreateNewAccount_update2_1 extends Task{
```

```
        public void task( ){
            try{
                //do operation on Database 2
                DataSource ds=ctx.lookup("addressDataSource");
                java.sql.Connection con=ds.getConnection( );
                java.sql.Statement stmt=con.createStatement( );
                java.sql.Resultset res=stmt.execute("insert into addressTable
                    values("+login+","+address+");");
                stmt.close( );
                con.close( );
            }
            catch(java.lang.Exception ex){
                m_ex=ex;
            }
            notifyall( );
        }
    }
    private TcreateNewAccount_update1_0
    tcreateNewAccount_update1_0=
    new TcreateNewAccount_update1_0( );
    private TcreateNewAccount_update2_1
    tcreateNewAccount_update2_1=
    new TcreateNewAccount_update2_1( );
    public void createNewAccount(String login, String passwd,
    String address){
        acreateNewAccount_0=login;
        acreateNewAccount_1 =passwd;
        acreateNewAccount_2=address;
        Scheduler.schedule(tcreateNewAccount_update1_0);
        Scheduler.schedule(tcreateNewAccount_update2_1);
        java.lang.Exception ex =
        Scheduler.wait(tcreateNewAccount_update1_0);
        if(ex!=null) throw ex;
        ex = Scheduler.wait(tcreateNewAccount_update2_1);
        if(ex!=null) throw ex;
    }
}
```

In one embodiment, concurrent code generator 105 transforms marked blocks of the marked code 102 into corresponding tasks extending from a class of the concurrency support code 107. A task of concurrent code 104 may correspond to a concurrent block in a method of marked code 102. In one embodiment, the concurrent code generator 105 may have used a specific naming convention to generate the tasks. The concurrent code generator 105 may initiate other types of actions to generate the concurrent code 104. For example, in an object-oriented language as shown in the exemplary concurrent code 104, classes (e.g., via an import statement) referenced in the marked code 102 may be replaced in the concurrent code 104 with a different class (e.g., com.xxx.concurrency) because the markers (e.g., as indicated by the marking API) are replaced in the concurrent code 104.

The IMT framework 101 may reference other functionality of concurrency support 107. For example, one embodiment of an IMT framework 101 may be configured to use a Thread class of concurrency support 107 to implement a thread pool 109. In one embodiment, concurrent code 104 may generate code to implement specialized threads (e.g., threads of the thread pool 109 that may be managed by a thread manager of the IMT framework 101 at run-time) that may require initialization before executing an arbitrary task. A registration function, or hook, may be required so that a thread of a thread pool 109 may signal (e.g., to a scheduler of concurrency support 107) that the thread is initialized and ready to be assigned a task to execute. In one embodiment, a Scheduler class (e.g., Scheduler.submitThread, a member of the Scheduler class described above) may provide the registration function to be used by the threads. The code snippet for an exemplary Thread class may be configured as follows.

```
package com.xxx.concurrency;
class Scheduler {
    ...
    public static void submitThread( );
    public static void submitThread(ThreadEventHandler eHandler);
}
```

A ThreadEventHandler application programming interface to handle events during execution of each thread may be configured as the following:

```
package com.xxx.concurrency;
interface ThreadEventHandler {
        void preTask(Thread parentThread);
        void postTask( );
}
```

Concurrent code 104 may include software code that may later be translated into machine code by a compiler or interpreter, for example, for the programming language. Concurrent code 104 may include references to concurrency support code 107 that may provide concurrency functionality for the programming language. Concurrent code 104 may be linked to the concurrency support code 107 to generate running code 106.

Concurrency support 107 may include a scheduler, thread manager and any other functionality to support multi-threaded execution. In one embodiment, a scheduler may be configured to schedule the tasks for multi-threaded execution. Threads of the thread pool 109 may be initialized so that the threads are ready to execute tasks. The threads, in one embodiment, may be submitted to the scheduler by calling, for example, registration functions (e.g., submitThread( )).

One embodiment of the IMT framework 101 may be configured to include a tracking tool to log information for tracing and/or profiling, for example, of concurrent tasks during execution of the running code. The running code 106 may be instrumented for logging in response to an indicated compiler option, for example. The instrumented running code 106 may be configured to collect and output (e.g., via the tracking tool) code coverage information for statements and paths, for example, of each concurrent task during execution. A log file may be created that includes profile information (e.g., task execution counts, control flow graph, time taken for resources referenced such as memory, network bandwidth, permanent storage accesses) for a particular execution, for example. Various external tools to the IMT framework 101 may be configured to access the logged information tracked during execution of running code 106.

The following guidelines describe handling of different abnormal conditions, if encountered, during execution of the running code 106, according to one embodiment. The following guidelines are exemplary. Many other conditions may be handled by various embodiments of the IMT framework 101. Various conditions occurring during execution of the running code may be handled so that the external behavior of the multi-threaded running code is the same as the sequential code from which the running code was derived. For example, in the case where multiple exceptions (e.g., run-time error conditions) are initiated by more than one concurrent block in a task, one of the exceptions may be selected for return to a caller. In one embodiment, an exception for the concurrent block that was started the earliest may be returned and other exceptions may be ignored. Selecting one exception may help insulate the caller (e.g., code that calls a method) of the method from the concurrency of the blocks.

The concurrent blocks may include conditional returns. Thus, returning from each concurrent block may mean returning from the concurrent block instead of the method. In one embodiment, one of the multiple return values may be selected from the multiple concurrent blocks. For example, a method may return the return value from a concurrent block that finishes execution last among the method's concurrent blocks. There may be other guidelines for determining a single return value from a plurality of return statements within a plurality of concurrent blocks of a single method. For example, a method may return the return value from a concurrent block that finishes execution first among the method's concurrent blocks.

In one embodiment, potential concurrent blocks may be nested within other potential concurrent blocks. Thus, one embodiment of an IMT framework 101 may require execution of nested concurrent blocks within an enclosing concurrent block to finish before execution of the enclosing concurrent block may be deemed complete. In one embodiment, a method may be implicitly assumed to be a block of code. Thus, execution of concurrent blocks within a method of the running code 106 may need to finish in order for execution of the method to be deemed complete (e.g., for the method to exit).

Figure 2:
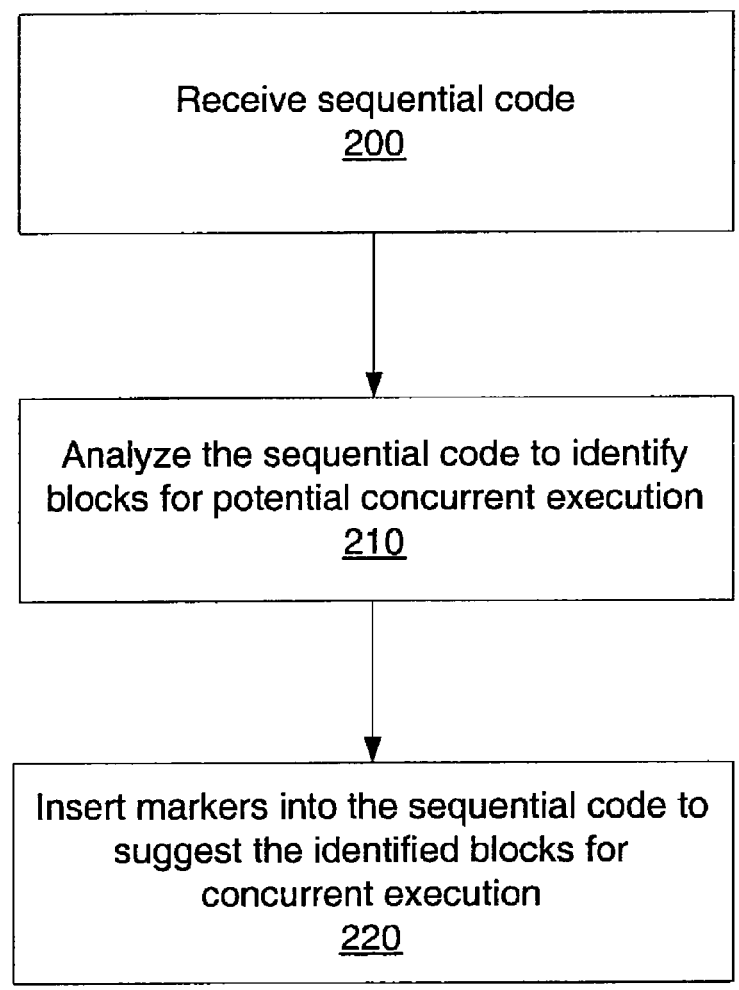
FIG. 2 shows a flowchart of one embodiment of a method for specifying blocks of code for potential concurrent execution.

FIG. 2 shows a flowchart of one embodiment of a method for specifying blocks of code for potential concurrent execution. In one embodiment, the method may include receiving software code initially configured for sequential execution, as indicated in 200. For example, an automated code marker tool may receive the sequential code or an editor being used by a developer for marking. The sequential code may include portions of code that may be blocked from execution until some other operation outside the scope of a host, or outside the scope of a processor within the host, completes. The sequential code may be configured as a simple program with non-blocking code segments (e.g., assigning a value to two different variables). Other types of sequential code written in various languages may be received.

In one embodiment, the sequential code may be analyzed to identify blocks of code for potential concurrent execution, as indicated in 210. The blocks of code may be portions of code within the scope of a code fragment (e.g., methods, procedures, subroutines, functions). In one embodiment, a program method may be the unit of software code analyzed to identify blocks of code for potential concurrent execution. One or more blocks of code within one or more methods may be analyzed for potential concurrent execution.

Analyzing the sequential code may be performed by a developer with knowledge of the execution behavior of the sequential code or by an automated code marker, for example. For example, the developer may know that one portion of the sequential code executes completely independent from another portion of the sequential code. In one embodiment, analyzing the sequential code may include parsing the sequential code and evaluating dependencies among portions of the code to identify points for potential concurrent execution. Many variations of an analysis may be performed to identify potential points for concurrent execution.

One embodiment may include a marking API to specify one or more blocks of code that may run concurrently during execution. One or more markers may be inserted in the sequential code to suggest the identified blocks for concurrent execution, as indicated in 220. In other embodiments, markers within the marked code may be used for other purposes.

For example, the markers may be used to generate documentation. After insertion of the markers into the sequential code, the sequential code may be referred to as marked code. The markers may indicate potential points (e.g., blocks of code) within code fragments (e.g., methods, procedures, subroutines, functions) where multi-threading should be introduced. Since the markers represent potential points for concurrent execution, the markers may be removed and/or disregarded at any point after specification to execution of the code. The markers may simply be inserted without making assumptions about semantic behavior (e.g., properties of a run-time object) of the sequential code at run-time since the markers may be used and/or disregarded.

In one embodiment, the markers may assign additional meaning to pre-existing constructs of a programming language. For example, markers may be existing programming language statements such as C statements, Lisp statements and FORTRAN statements. In one embodiment, static method calls of a programming language may be used for the marking API. For example, in an object-oriented language such as Java, C++ and Smalltalk, the marking API may include the methods and members of a static class (e.g., procedures within an object-oriented class as a category of objects, and associated data types and functions for each of the procedures). The constructs may be assigned additional meaning so that software code that includes the markers may be translated (e.g., compiled or interpreted) in the same manner as software code that excludes the markers (e.g., sequential code).

While inserting the markers, a block of code may be qualified with extra information that specifies hints for execution of the block of code in relation to another block of code. In one embodiment, a block method may be overloaded (e.g., one of many different methods) with other block methods. A block of code may be qualified with extra information by using an overloaded block method. For example, each of the blocks of code may be assigned a specific name (e.g., String), a priority, dependencies and/or an execution duration (e.g., weight).

Figure 3:
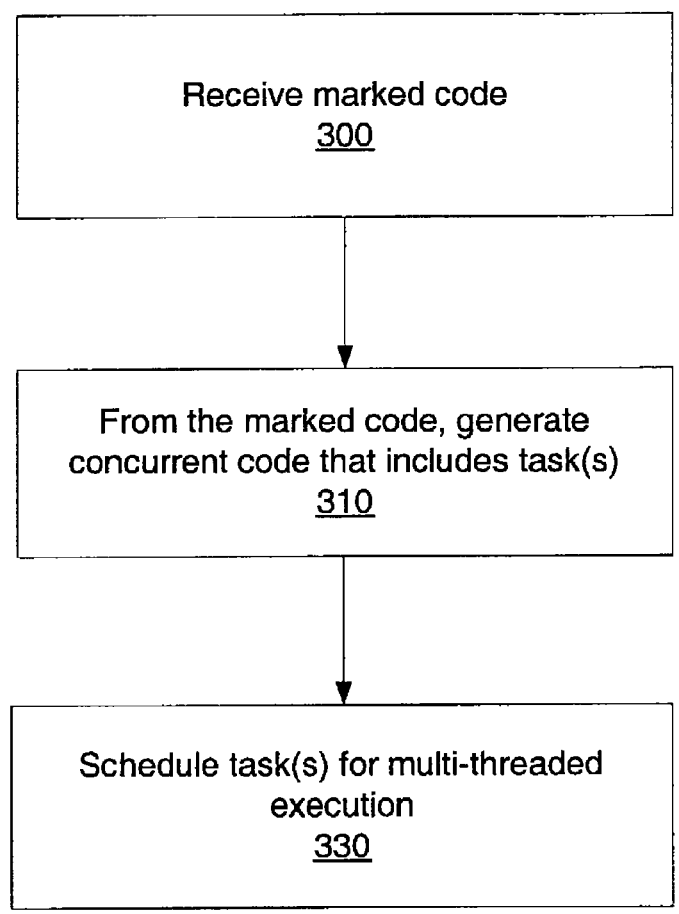
FIG. 3 shows a flowchart of one embodiment of a method for transforming marked code into concurrent code.

FIG. 3 shows a flowchart of one embodiment of a method for transforming marked code into concurrent code. The method may include receiving marked code, as indicated in 300. In one embodiment, a concurrent code generator may receive the marked code. The marked code identifying one or more blocks of code for potential concurrent execution, may have been generated as described with FIG. 2. In one embodiment, the marked code may be parsed and modified to generate concurrent code, as indicated in 310. In one embodiment, markers may be replaced in the marked code with programming statements that exclude the block method calls. Thus, the marked code may be transformed into concurrent code that induces concurrent execution of the blocks of code as initially indicated by the markers.

The concurrent code may include one or more tasks configured for concurrent execution in place of the one or more marked blocks of code. The concurrent code may include references to shared programming language resources (e.g., dynamically linked libraries, shared objects, shared libraries, built-in code) that may provide concurrency functionality for the programming language. In one embodiment, the concurrent code may be generated in response to an indicated option from one or more compilers, interpreters and/or parsers, for example.

In one embodiment, an analysis of the marked code may be performed to validate different rules and/or handle different conditions before transforming the marked code into concurrent code. For example, one block spanning over an entire method would be ignored during the transformation process to reduce the overhead of scheduling the one block that is essentially still sequential. In one embodiment, the concurrent code may be generated based on a naming convention. In one embodiment, synchronization points (e.g., code that induces a thread to enter a wait state) may be included in the concurrent code.

In one embodiment, programming language code may be included in the concurrent code to reference a scheduler to schedule each task of concurrent code. The scheduling, as indicated in 330, may be based on information included in marked code. For example, an opening block statement of a concurrent block in the concurrent code may include a priority and dependencies on one or more other concurrent blocks. For example, a task (as indicated by the marked code) may be scheduled to begin execution before another task.

Figure 4:
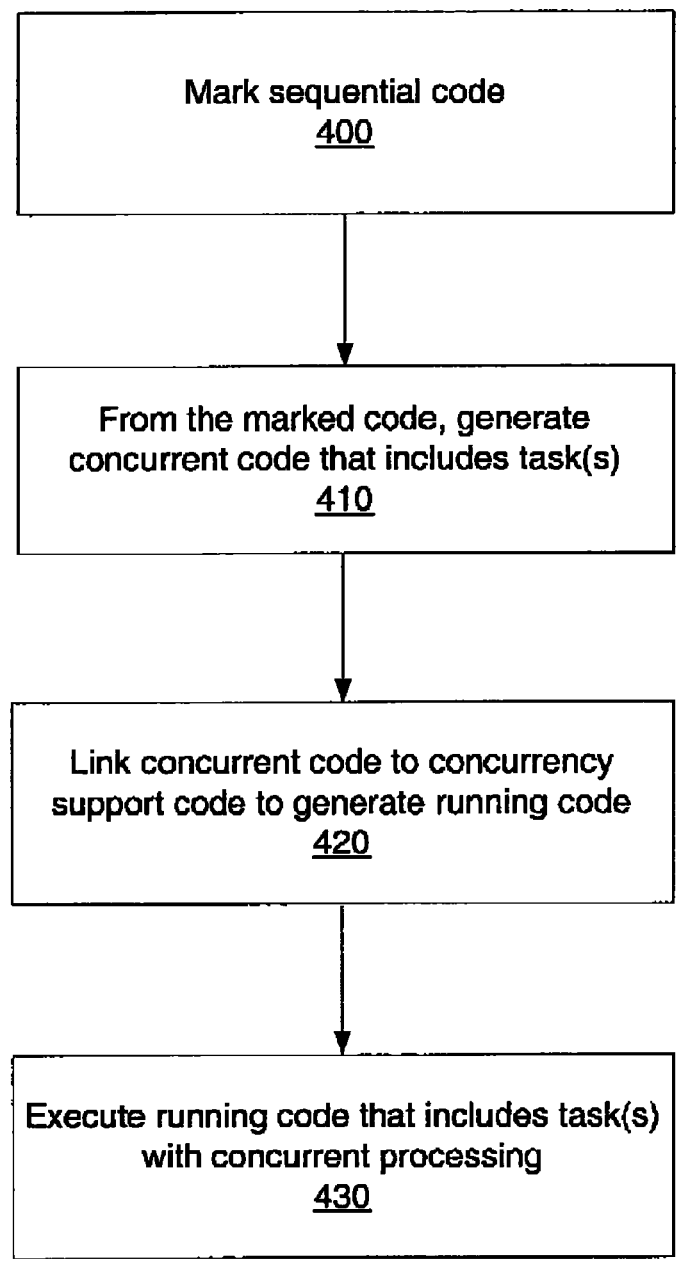
FIG. 4 shows a flowchart of a method for using an IMT framework to induce multi-threading in software code, according to one embodiment.

FIG. 4 shows a flowchart of a method for using an IMT framework to induce concurrent execution in software code, according to one embodiment. One or more blocks of code within a method, for example, of sequential code may be marked for potential concurrent execution, as indicated in 400. As described with FIG. 2, the sequential code may be marked manually, or with an automated code marker, to identify the one or more blocks. For example, a developer may use an automated code marker to analyze and mark the sequential code.

From the marked code, concurrent code may be generated, as indicated in 410. The concurrent code may include one or more tasks scheduled for potential concurrent execution, as described with FIG. 3. The concurrent code may include references to shared programming language resources that may provide concurrency functionality for the programming language. For example, the concurrent code may include references to code of one or more shared libraries configured to schedule each task concurrently.

The concurrent code may be linked to concurrency support code to generate running code, as indicated in 420. For example, the concurrency support code may include shared libraries for scheduling the concurrent blocks of code for concurrent execution. The developer may then execute the running code that includes task(s) with concurrent processing, as indicated in 430. The one or more tasks may have been identified as tasks in the concurrent code and were scheduled for concurrent execution.

Figure 5:
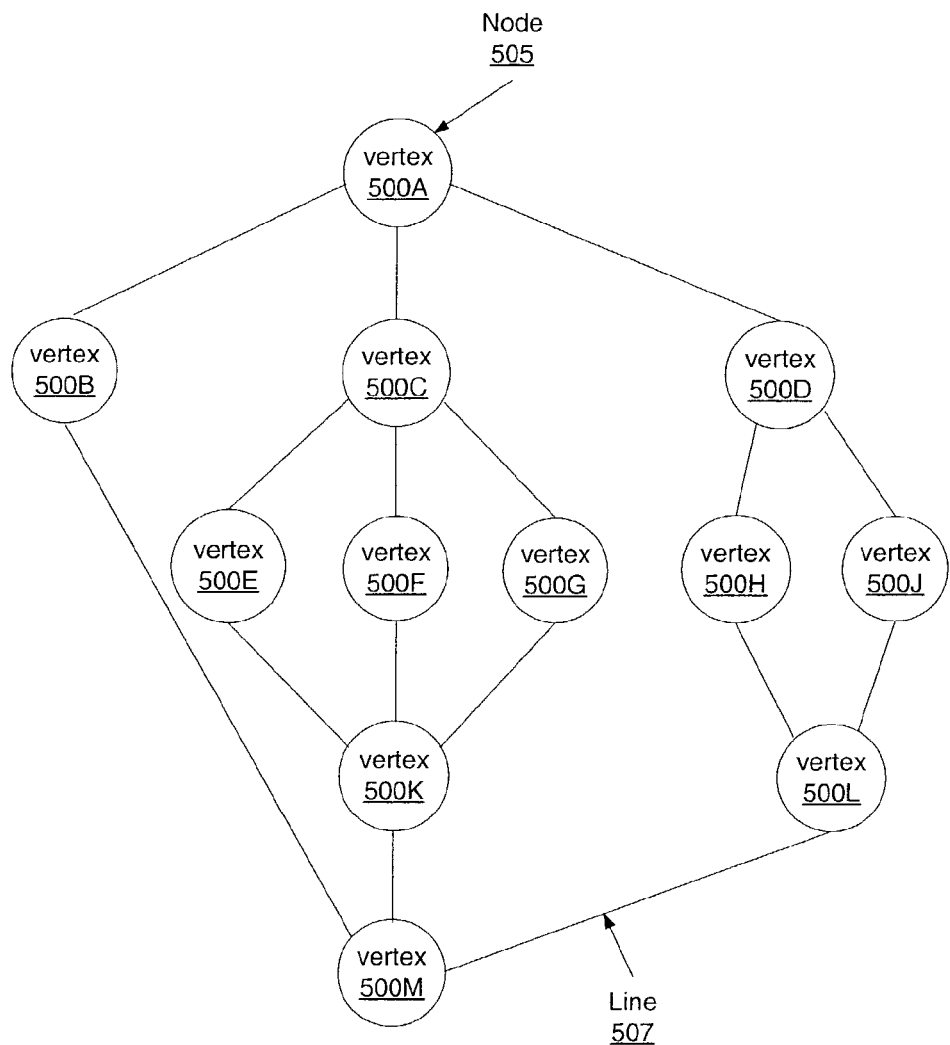
FIG. 5 illustrates a connected acyclic directed graph representation of the marked code.

In one embodiment, the concurrent code generator may be configured to perform an analysis of marked code to estimate performance benefits of concurrent execution before transforming the marked code into concurrent code. The markers, as described with FIGS. 1 and 2, may be used and/or ignored during the analysis since the markers represent potential points for concurrent execution. In one embodiment, the results of the analysis may be used to transform the marked code into concurrent code. FIG. 5 illustrates a connected acyclic directed graph representation 500 of the marked code generated during an analysis of the marked code. In one embodiment, the analysis may represent the marked code as vertices (e.g., nodes 505) and edges (e.g., lines 507). In one embodiment, each vertex may represent a block of code that may be scheduled for execution. Each line may correspond to a task which may be the marked unit of code scheduled for execution by the IMT framework 101. In one embodiment, the IMT framework 101 may be configured to output an actual graph representation (e.g., printout of the graph).

During the analysis, in one embodiment, each vertex may represent the beginning or the end of a block of code. An edge may begin at one vertex and end at another vertex. Two vertices connected by an edge may be said to be adjacent. In one embodiment, a path of the represented graph may include a sequence of adjacent vertices. Referring back to the exemplary concurrent code 106, each Scheduler.schedule and Scheduler.wait call may be represented in a graph as a vertex 500. An edge may begin at a vertex 500A representing a Scheduler.schedule call. The edge may end at a vertex 500B representing a Scheduler.wait call.

The properties of a vertex may apply to edges emanating from the vertex. For example, a vertex may be associated with properties that may include possible scheduling priorities, possible exceptions and possible return values for corresponding blocks of code (as represented by edges to the vertex). In one embodiment, the analysis may use edges and properties of the vertices to compute a running length or cost for each path. For example, the analysis may traverse data representing the graph to calculate the number of programming statements of each vertex and each edge between a beginning vertex and an ending vertex for each block. During the analysis, modifications to the marked code may be suggested by determining which marked blocks of code would meet a performance benefit threshold if executed concurrently. For example, the performance benefit threshold may be determined by comparing the estimated execution duration of each marked block to an overhead for scheduling the concurrent blocks.

In one embodiment, as described with the marking API, a developer may specify a running duration (e.g., weight) of each block in the marked code. The analysis may include the weight as a property of each vertex. The analysis may traverse data representing the graph to determine the running duration of each path by totaling the running durations of vertices in the path. The analysis may suggest a path that may have a lower running cost than one or more other paths represented by the graph. In one embodiment, the analysis may suggest that blocks be scheduled to begin execution in order of decreasing running duration. For example, a block with a longest running duration may be scheduled to begin execution first. In other embodiments, suggestions may be based on other scheduling schemes. In one embodiment, the concurrent code generator may modify the code to implement the suggestions from the analysis. In one embodiment, each block of code may be analyzed to determine if the block of code meets the performance benefit threshold. If the concurrent block meets the performance benefit threshold, the block of code may be transformed into a task by the concurrent code generator.

Exceptions thrown by blocks of the concurrent code may be modeled on a graph such as the graph of FIG. 5. If an exception is thrown, one or more executing concurrent blocks may be interrupted. The block interruption may be represented in the graph by a truncated edge. In one embodiment, the graph may take dependencies between blocks in concurrent code into account. If an exception is thrown, for example, and an edge is truncated as a result of the thrown exception, vertices and edges representing blocks dependent on an interrupted block may be modified and/or removed. In one embodiment, the edges may represent control flow. For example, if a block is dependent on another block, an edge of the other block may go from the other block to the dependent block. If other blocks do not depend on a block, an edge included in the block's graph representation may end at the vertex representing the end of a method including the block.

In one embodiment, the analysis may also be used to identify potential run-time problems with marked blocks of code. In one embodiment, the data representing the graph may indicate cycles. A cycle may be a path in which the first vertex is also the last vertex. In one embodiment, the concurrent code generator may not determine a schedule for beginning execution of the blocks represented in the cycle. The concurrent code generator may signal an error condition. In one embodiment, the concurrent code generator may automatically modify the concurrent code to remove the cycle.

The specified blocks of code may be scheduled for multithreaded execution based on the results of the analysis. Although, in one embodiment, the markers have been replaced in the concurrent code, the IMT framework may still be configured to identify the concurrent blocks. For example, variables used in the concurrent code may indicate the concurrent blocks. In one embodiment, variables may be passed to the scheduler when the thread is initiated to execute. The identified blocks of code may be used and/or ignored during the analysis since the concurrent blocks represent potential points for concurrent execution.

Figure 6:
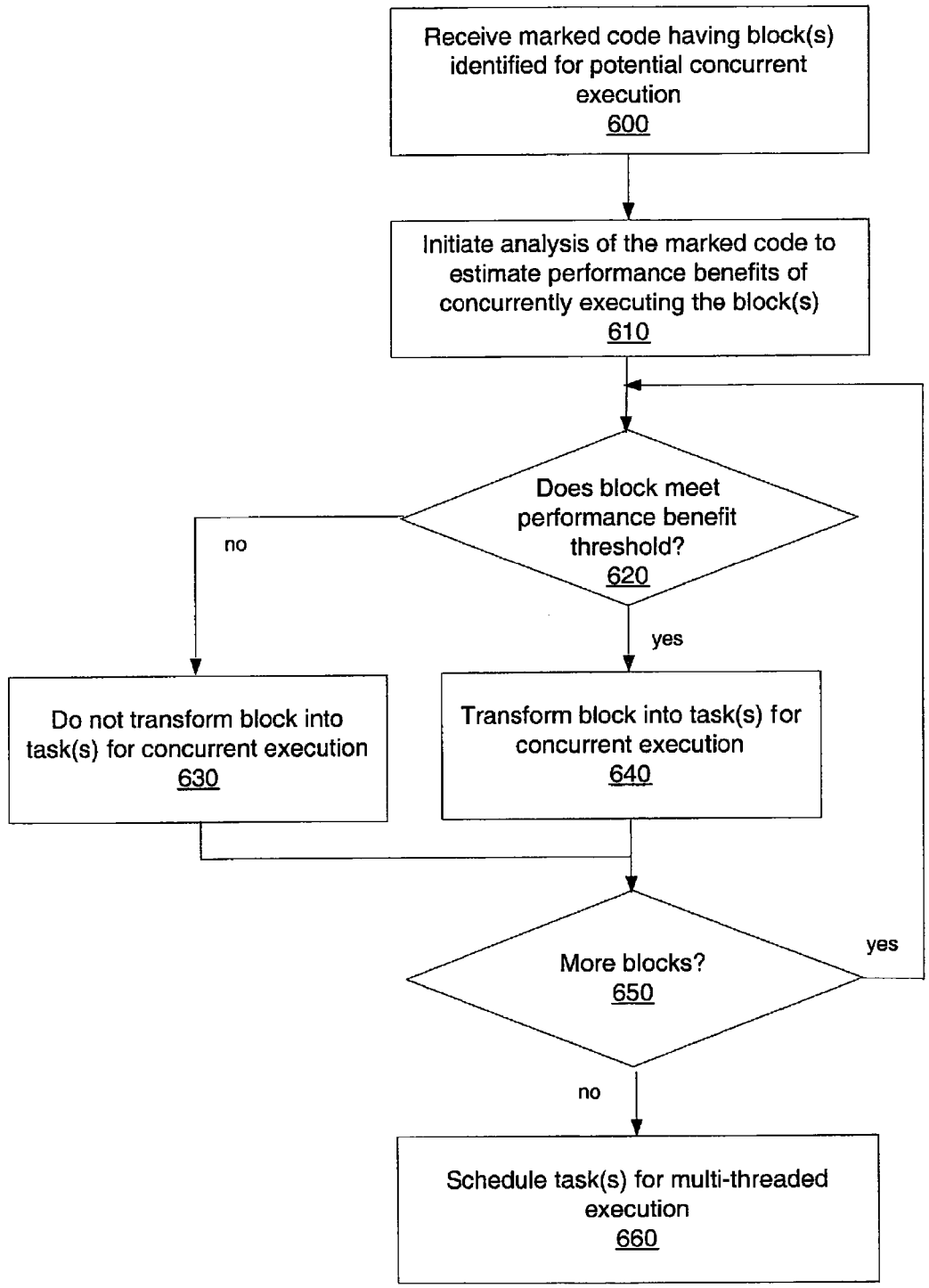
FIG. 6 shows a flowchart of one embodiment of a method for analyzing marked code and scheduling tasks for multi-threaded execution based on the results of the analysis.

FIG. 6 shows a flowchart of one embodiment of a method for analyzing marked code and scheduling tasks for multithreaded execution based on the results of the analysis. In one embodiment, the method may include receiving marked code having blocks identified for potential concurrent execution, as indicated in 600. The marked code may have been generated as described with FIG. 2. An analysis of the marked code may be performed to estimate performance benefits of concurrent execution before transforming the marked code into concurrent code, as indicated in 610. For example, a performance benefit threshold may be determined by comparing the estimated execution duration of each marked block to an overhead for scheduling the concurrent blocks. Markers may be used and/or ignored during the analysis since the markers represent potential points for concurrent execution.

A connected acyclic directed graph representation of the marked code, as described with FIG. 5, may be used during an analysis of the marked code. The marked code may be modified to implement the suggestions from the analysis. In one embodiment, each block of code may be analyzed to determine if the block of code meets the performance benefit threshold, as indicated in 620. If the concurrent block meets the performance benefit threshold, the block of code may be transformed into a task, as indicated in 640. Otherwise, the concurrent block may not be transformed, as indicated in 630. The analysis process may continue until all of the concurrent blocks have been analyzed, as indicated in 650.

The specified blocks of code may be scheduled for multithreaded execution based on the results of the analysis, as indicated in 660. In one embodiment, the analysis may suggest that blocks be scheduled to begin execution in order of decreasing running time. For example, a block with a longest running time may be scheduled to begin execution first. In other embodiments, suggestions may be based on other scheduling schemes.

One embodiment of the IMT framework may be configured, as described with FIG. 6, to use blocks of code as the basis for scheduling a plurality of blocks for potential concurrent execution. A developer and/or an automated code marker, for example, may have specified block-level performance criteria for each block of code that may potentially be executed concurrently. Markers may have been embedded to identify each block of code. Demarcation of block-level code suggestive for concurrent execution may be useful in deciding a block-level performance criterion for each block marked for potential concurrent execution. For example, one embodiment of the IMT framework may be configured to perform an analysis of the generated concurrent code to determine block-level performance criteria, such as priority, dependency and/or weight duration, for use when scheduling a plurality of blocks. In one embodiment, the analysis may be performed using data representative of the concurrent code similar to the acyclic graph described with FIG. 5.

Multi-threaded execution of the plurality of blocks may be optimized to reduce the overall execution time of the running code (as scheduled by the scheduler). In one embodiment, a scheduler may be configured to initiate multi-threaded execution of the plurality of blocks in an order determined by the block-level performance criteria to reduce the overall execution time of the running code. For example, priority and weight information for each concurrent block may have been specified in the marked code (and/or determined during analysis of the concurrent code) and the scheduler may schedule each concurrent block of the plurality of blocks according to the priority and weight information to reduce the overall execution time of the running code. In one embodiment, the scheduler may be configured to schedule concurrent blocks having longer execution durations ahead of concurrent blocks having shorter execution durations.

Demarcation of block-level code may be used in various ways to optimize execution of the running code. The running code may have been instrumented to collect and log performance data for each concurrent task during execution. For example, in one embodiment, a tracking tool may log information for tracing and/or profiling of concurrent tasks during execution of the running code. A log file may be created that includes measured block-level performance data (e.g., block execution counts, block execution durations, block paths and edges, block execution predictions) for a particular execution, for example. In one embodiment, the scheduler may be configured to access the measured block-level performance data generated during previous executions of the running code. For example, the scheduler may be configured to read previously stored measured block-level performance data as indicated by a compiler option during recompilation. In one embodiment, the scheduler may be configured to determine the block-level performance criteria for each block of concurrent code according to measured block-level performance data generated from prior executions of each concurrent block. Repeating the process of feeding measured block-level performance data back to the scheduler may optimize multi-threaded execution of the concurrent blocks because of the benefit of new measured block-level performance data, for example.

Multi-threaded execution of the plurality of blocks may be optimized by changing the markings in marked code (e.g., move blocks of code around) and/or changing the block-level performance criteria specified in the marked code. For example, a developer may determine that certain execution duration of a block (e.g., threshold weight of block) causes the running code to execute faster. The block-level performance criteria specified in the marked code, for example, the priority and weight of each block, may be modified to improve the overall execution time of the running code. Thus, repeatedly executing the running code, evaluating measured block-level performance data and repeatedly regenerating the running code may result with running code that executes faster. The data that is collected may be converted into performance metrics. Metrics may be viewed in tabular form at the object, function, method, block of code, source line or instruction level. Code that may be responsible for resource usage, inefficiencies or time delays, for example, may be modified to improve concurrent execution of the blocks. The markers may also be embedded and/or changed within compiled code (e.g., Java byte-code).

Figure 7:
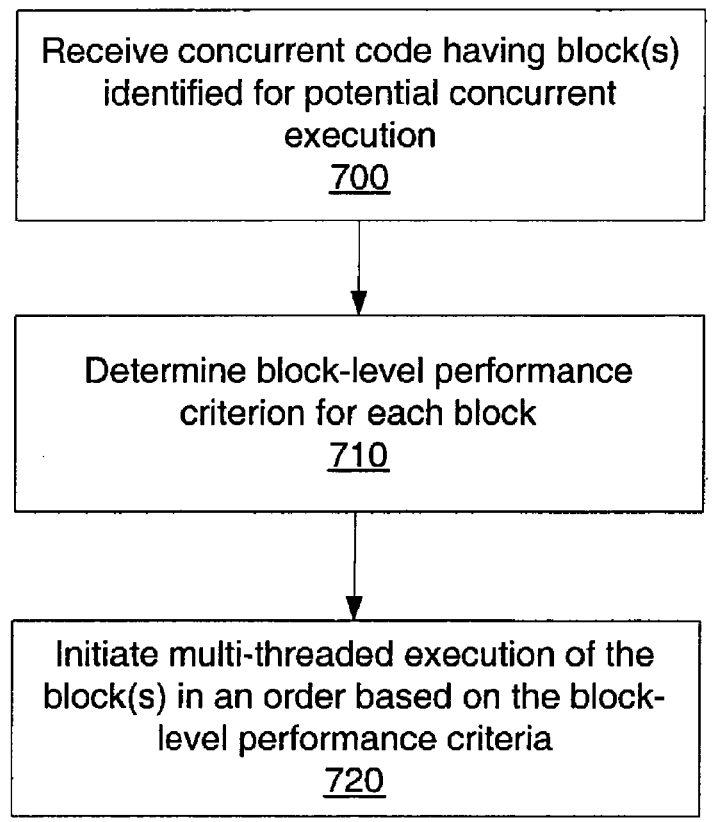
FIG. 7 shows a flowchart of one embodiment of a method for scheduling a plurality of concurrent blocks for multi-threaded execution in an order determined by block-level performance criteria.

FIG. 7 shows a flowchart of one embodiment of a method for scheduling a plurality of concurrent blocks for multi-threaded execution in an order determined by block-level performance criteria. In one embodiment, the method may include receiving concurrent code having blocks identified for potential concurrent execution, as indicated in 700. Blocks of code, as identified in the concurrent code (initially demarcated in marked code of the concurrent code), may be used as the basis for scheduling the plurality of blocks for potential concurrent execution.

An analysis of the concurrent code may be performed to determine block-level performance criteria, such as priority, dependency and/or weight duration, for use when scheduling a plurality of blocks, as indicated in 710. In one embodiment, the analysis of the concurrent code may be performed to determine the block-level performance criteria. In one embodiment, the analysis may be performed using data representative of the concurrent code similar to the acyclic graph described with FIG. 6.

In one embodiment, multi-threaded execution of the plurality of blocks in an order based on the block-level performance criteria may be initiated to reduce the overall execution time of the running code. For example, each concurrent block of the plurality of blocks may be scheduled according to priority and weight information to reduce the overall execution time of the running code. In one embodiment, concurrent blocks having longer execution durations may be scheduled ahead of concurrent blocks having shorter execution durations.

Figure 8:
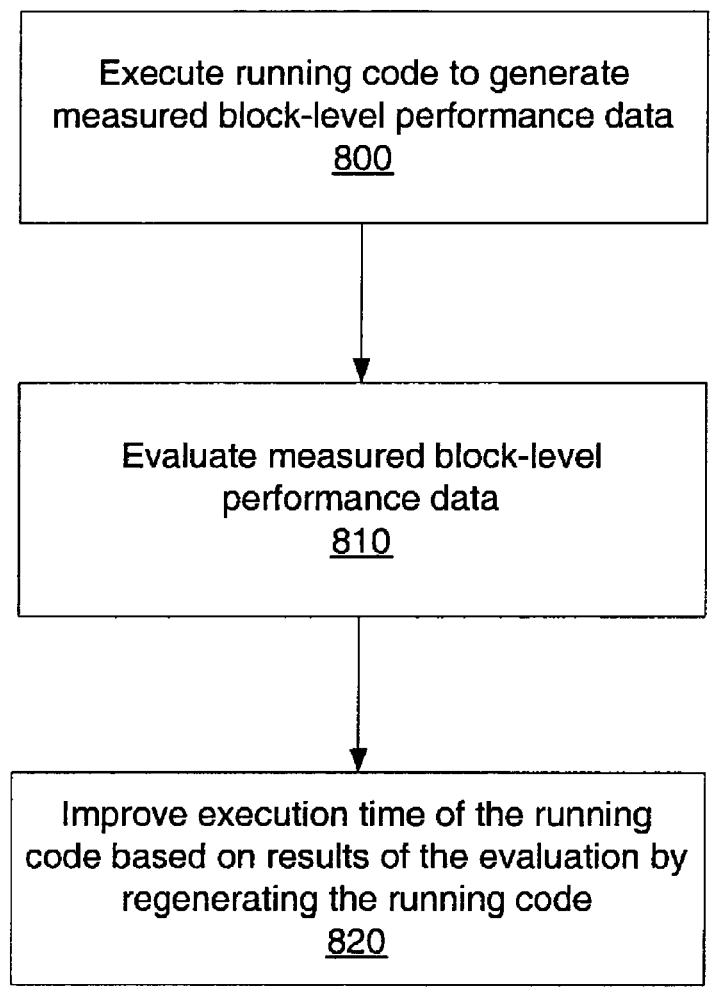
FIG. 8 shows a flowchart of a method for using an IMT framework to reduce the overall multi-threaded execution time of a plurality of blocks, according to one embodiment.

FIG. 8 shows a flowchart of a method for using an IMT framework to reduce the overall multi-threaded execution time of a plurality of blocks, according to one embodiment. Multi-threaded execution of the plurality of blocks may be optimized to reduce the overall execution time of the running code (as scheduled by a scheduler). A developer, for example, may execute running code, as indicated in 800. The running code may have been instrumented during compilation, for example, to collect and log performance data for each concurrent task during execution. A log file may be created that includes measured block-level performance data (e.g., block execution counts, block execution durations, block paths and edges, block execution predictions) for a particular execution, for example.

In one embodiment, the developer, for example, may evaluate the generated measured block-level performance data to determine what types of changes may be implemented to optimize execution of the running code, as indicated in 800. The developer may attempt to improve execution time of the running code based on results of the evaluation by making enhancements and/or regenerating the running code, as indicated in 820. Various enhancements may be performed. The developer may decide to feed the measured block-level performance data back to the scheduler. The scheduler may be configured to read previously stored measured block-level performance data as indicated by a compiler option during recompilation. In one embodiment, the scheduler may be configured to determine the block-level performance criteria for each block of concurrent code according to measured block-level performance data generated from prior executions of each concurrent block. The developer may continue to repeat the process of feeding measured block-level performance data back to the scheduler because of the benefit of new measured block-level performance data, for example.

The markings in the marked code may also be changed. For example, the developer may move blocks of code around and/or change the block-level performance criteria specified in the marked code. A developer may determine that certain execution duration of a block (e.g., threshold weight of block) causes the running code to execute faster. The block-level performance criteria specified in the marked code, for example, the priority and weight of each block, may be modified to improve the overall execution time of the running code. Thus, repeatedly executing the running code, evaluating measured block-level performance data and repeatedly regenerating the running code may result with running code that executes faster.

Figure 9:
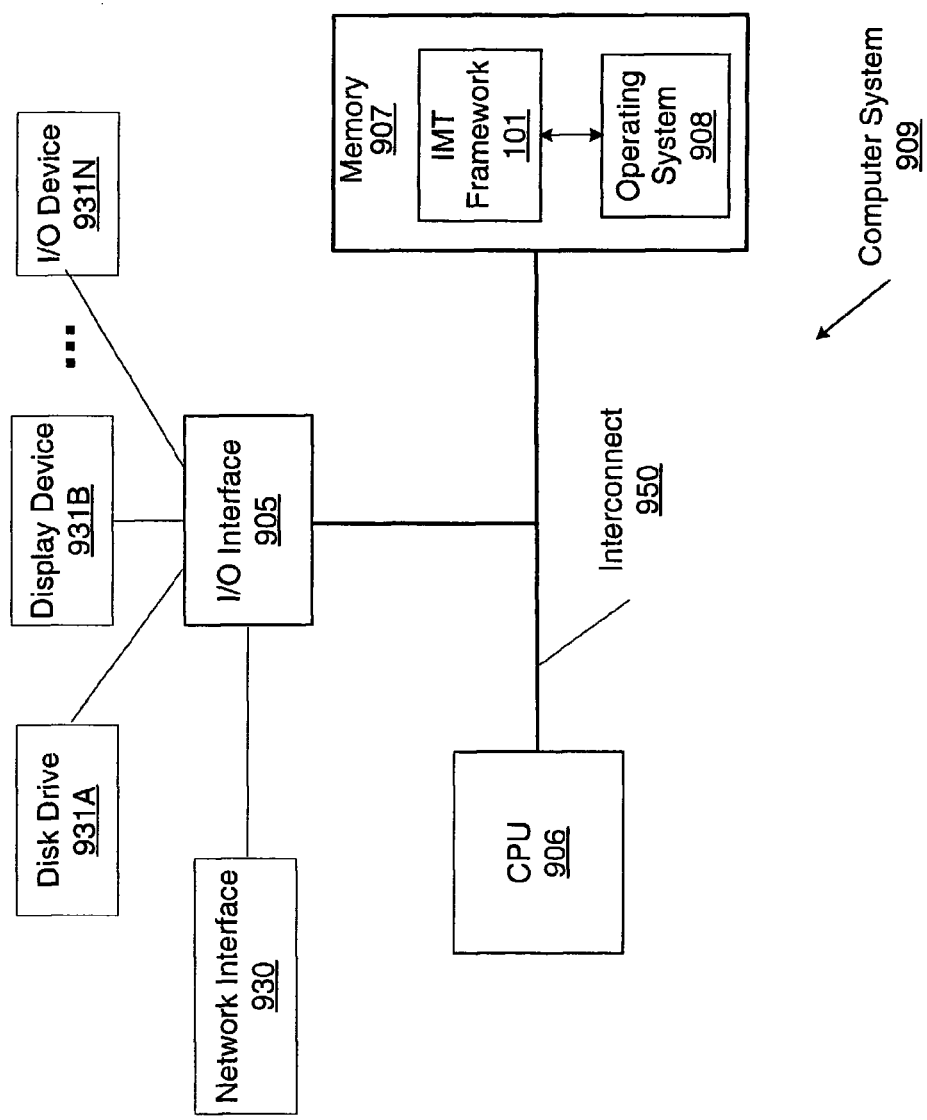
FIG. 9 illustrates a computer system that may that may include one embodiment of an IMT framework to induce multi-threading in software code.

FIG. 9 illustrates a computer system 909 that may that may include an IMT framework 101 to induce multi-threading in software code as described above, according to one embodiment. Computer system 909 may include many different components such as memory 907, a central processing unit (CPU) or processor 906, an input/output (I/O) interface 905, operating system 908 and device interconnect 950. Interconnect 950 is relied upon to communicate data from one component to another. For example, interconnect 950 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus. Memory 907 may store program instructions accessed by the CPU 906. For example, instructions and data implementing an IMT framework 101 may be stored in memory 907. An operating system 908 may also be stored in memory 907.

Computer system 909 may further include other software and hardware components, such as a network interface 930, that may be coupled to various other components and memory 907. The CPU 906 may acquire instructions and/or data through the I/O interface 905. Through the I/O interface 905, the CPU 906 may also be coupled to one or more other components 931. As illustrated, components 931 may include disk drive 931A, a display device 931B and other I/O devices 931C for use with computer system 909 such as other CPUs, track balls, mice, keyboards, printers, plotters, scanners, etc. Some computer systems 909 may include additional and/or other components than shown in FIG. 9.

In one embodiment, the IMT framework 101 may be configured as part of an application server, for example. The application server may execute application components that operate across different computers based on different platforms and architectures. One embodiment of an IMT framework 101 may be implemented on a single computer. The software code may be implemented, for example, on virtual machines (VMs) (e.g., Java Virtual Machines) coupled to one embodiment of an IMT framework 101. The virtual machines may be implemented on one or more computers. The IMT framework 101 may operate on different and various types of computers that may communicate to each other over a network. For example, a client (e.g., Web browser) may operate on a desktop computer running Windows™ NT from Microsoft and an IMT framework application server, in one embodiment, may operate on a minicomputer running an operating system such as Sun™ Linux from Sun Microsystems.

Figure 10:
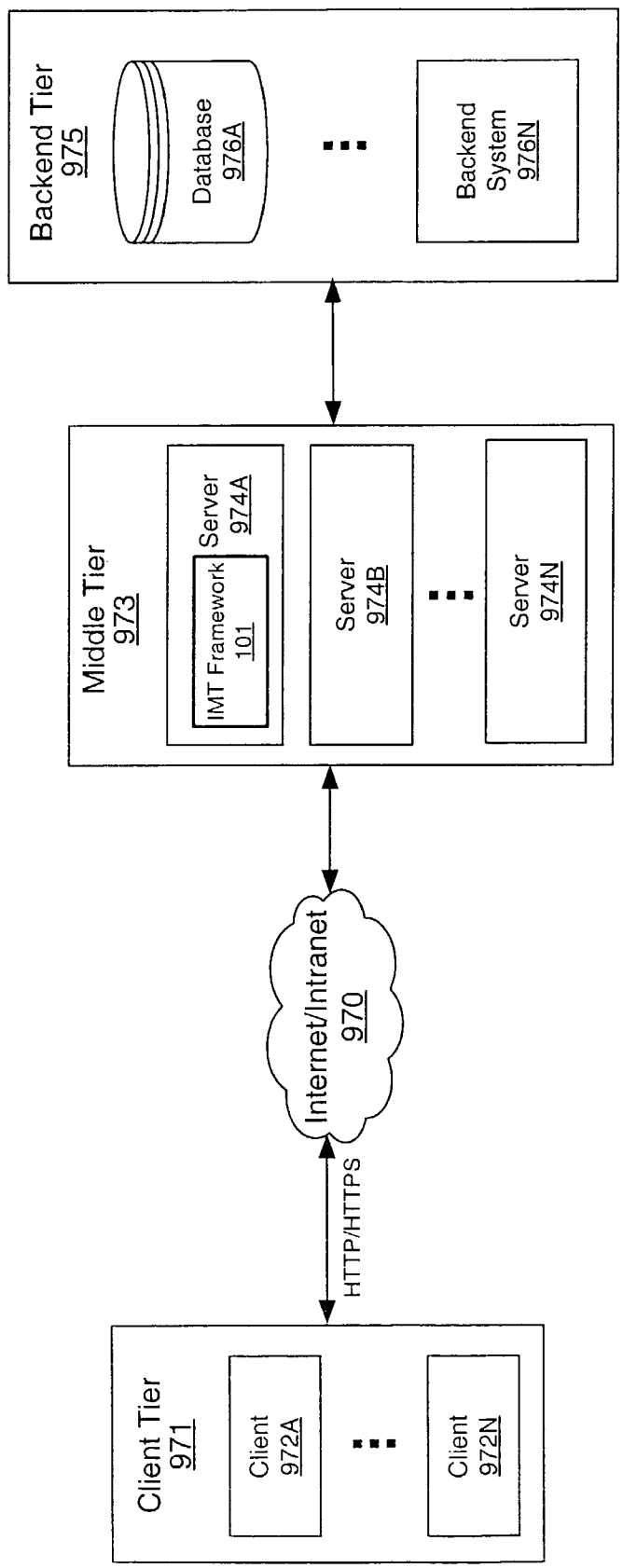
FIG. 10 illustrates one embodiment of an IMT framework configured as part of an application server.

FIG. 10 illustrates an IMT framework 101 configured as part of an application server 974A, according to one embodiment. The application server 974A including IMT framework 101 may be configured to operate on a computer system as described with FIG. 9. One or more developers may use the IMT framework 101 to identify which blocks of code within a portion of software code may run concurrently during execution of the software code. The application server 974A may execute application components (e.g., Java™ Servlets, JavaServer Pages™ and Enterprise JavaBeans™), for example, of an Internet-based application. The Internet-based application may be based on a three-tier architecture including a client tier 971, a middle tier 973 and a backend tier 975.

Software code developed and executed with various embodiments of the IMT framework 101 may operate differently or on a different architecture than the application server 974A shown in FIG. 10. Thus, FIG. 10 illustrates an exemplary type of software code and architecture relying on the IMT framework 101. The IMT framework 101 may be utilized to develop various types of applications, or develop any type of software code having portions of code that may run concurrently.

The Internet-based application logic may be divided into application components according to function and the various application components may be installed on different computers depending on which tier the application component belongs. The application components, for example, may be specified and assembled with one embodiment of the IMT framework 101. The application server 974A, executing the application components operating across tiers, may be a resource within the middle tier 973. For example, a Web browser as a client 972 within the client tier 971 may operate on a computer that is configured to access the application server 974A via an Internet/Intranet 970 using an underlying protocol such as HyperText Transfer Protocol and HyperText Transfer Protocol Secure (HTTP/HTTPS). The resources within each tier may operate on different and various types of host computers that may communicate to each other over a network. For example, a client 972 (e.g., Web browser) may operate on a desktop computer running various operating systems such as Windows™ from Microsoft and Unix™ from Sun Microsystems, and the application server 974A may operate on a minicomputer running various operating systems such as Solaris™ and Sun™ Linux from Sun Microsystems.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
  one or more processors;
  a memory coupled to the one or more processors, wherein the memory is configured to store program instructions executable by the one or more processors to implement a framework to induce multi-threading, wherein the framework comprises:
    a concurrent code generator configured to receive marked code comprising sequential code having one or more blocks of code marked for concurrent execution, wherein each marked block of code is marked by including a marker method call within the code to suggest the block for potential concurrent execution, wherein the concurrent code generator is configured to generate concurrent code from the marked code, wherein the concurrent code comprises one or more tasks configured for concurrent execution in place of the one or more marked blocks of code; and a scheduler configured to schedule one or more of the tasks for multi-threaded execution.

2. The system as recited in claim 1, wherein one of the blocks of code marked for concurrent execution is a portion of a program method of the sequential code so that the concurrent code generator transforms a block of the sequential code that is less than an entire method of the sequential code into a task configured for concurrent execution.

3. The system as recited in claim 1, wherein the concurrent code generator is configured to perform an analysis of the marked code to estimate performance benefits of concurrent execution of the marked blocks of code, wherein the concurrent code generator does not transform one of the marked blocks into one of the concurrently executable tasks if the analysis indicates no performance benefit is estimated to result from concurrent execution.

4. The system as recited in claim 3, wherein for one or more of the marked blocks not transformed into one of the concurrently executable tasks due to the analysis, the concurrent code generator is configured to remove one or more marker method calls in the concurrent code.

5. The system as recited in claim 3, wherein the concurrent code generator is configured to perform the analysis based on an estimated execution time of each marked block compared to an overhead for scheduling concurrent threads.

6. The system as recited in claim 1, wherein the framework further comprises an automated code marking tool configured to:
receive the sequential code;
analyze the sequential code to identify potentially concurrently executable blocks of the sequential code; and
insert markers into the sequential code to suggest the identified blocks for concurrent execution.

7. The system as recited in claim 1, wherein the marked code comprises a marker for each block of code marked for concurrent execution, and wherein the scheduler is configured to schedule one of the tasks for multi-threaded execution according to priority information included with the marker for the corresponding marked block.

8. The system as recited in claim 1, wherein the marked code comprises a marker for each block of code marked for concurrent execution, and wherein the scheduler is configured to schedule one of the tasks for multi-threaded execution according to dependency information included with the marker for the corresponding marked block.

9. The system as recited in claim 1, wherein the framework further comprises a thread pool manager configured to manage a thread pool to provide threads for multi-threaded execution of the task of the concurrent code, wherein the scheduler is configured to request a thread from the thread pool for each task scheduled for multi-threaded execution.

10. The system as recited in claim 1, wherein the framework further comprises a tracking tool configured to be called for each concurrently executable task, wherein the tracking tool is configured to log information to trace or profile execution of the tasks.

11. A method, comprising:
receiving marked code comprising sequential code having one or more blocks of code marked for concurrent execution, wherein each marked block of code is marked by including a marker within the code to suggest the block for potential concurrent execution;
generating concurrent code from the marked code, wherein the concurrent code comprises one or more tasks configured for concurrent execution in place of the one or more marked blocks of code, and wherein the concurrent code comprises one or more tasks transformed from a class in the marked code into a derived class; and
scheduling one or more of the tasks for multi-threaded execution.

12. The method as recited in claim 11, wherein one of the blocks of code marked for concurrent execution is a portion of a program method of the sequential code, wherein said generating comprises transforming a block of the sequential code that is less than an entire method of the sequential code into a task configured for concurrent execution.

13. The method as recited in claim 11, wherein said generating comprises analyzing the marked code to estimate performance benefits of concurrently executing the marked blocks of code, wherein one of the marked blocks is not transformed into one of the concurrently executable tasks if said analyzing indicates no performance benefit is estimated to result from concurrent execution.

14. The method as recited in claim 13, wherein for one or more of the marked blocks not transformed into one of the concurrently executable tasks due to the analysis, said generating comprises removing one or more markers in the concurrent code.

15. The method as recited in claim 13, wherein said analyzing comprises comparing an estimated execution time of each marked block to an overhead for scheduling concurrent threads.

16. The method as recited in claim 11, further comprising marking the sequential code to suggest one or more blocks of the sequential code for concurrent execution.

17. The method as recited in claim 16, wherein said marking comprises:
receiving the sequential code;
analyzing the sequential code to identify potential concurrently executable blocks of the sequential code; and
inserting markers into the sequential code to suggest the identified blocks for concurrent execution.

18. The method as recited in claim 11, further comprising marking one or more blocks of the sequential code with a marker method call to suggest blocks for potential concurrent execution.

19. The method as recited in claim 11, wherein the marked code comprises a marker for each block of code marked for concurrent execution, and wherein said scheduling comprises scheduling one of the tasks for multi-threaded execution according to priority information included with the marker for the corresponding marked block.

20. The method as recited in claim 11, wherein the marked code comprises a marker for each block of code marked for concurrent execution, and wherein said scheduling comprises scheduling one of the tasks for multi-threaded execution according to dependency information included with the marker for the corresponding marked block.

21. The method as recited in claim 11, further comprising managing a thread pool to provide threads for multi-threaded execution of the task of the concurrent code, wherein said scheduling comprises requesting a thread from the thread pool for each task scheduled for multi-threaded execution.

22. The method as recited in claim 11, further comprising tracking each concurrently executable task, wherein said tracking comprises logging information to trace or profile execution of the tasks.

23. A tangible, computer accessible storage medium comprising program instructions, wherein the program instructions are executable to implement:

receiving marked code comprising sequential code having one or more blocks of code marked for concurrent execution, wherein the marked code comprises a marker for each block of code marked for concurrent execution;

generating concurrent code from the marked code, wherein the concurrent code comprises one or more tasks configured for concurrent execution in place of the one or more marked blocks of code; and scheduling one or more of the tasks for multi-threaded execution according to priority information included with the marker for the corresponding marked block.

24. The computer accessible medium as recited in claim 23, wherein one of the blocks of code marked for concurrent execution is a portion of a program method of the sequential code, wherein said generating comprises transforming a block of the sequential code that is less than an entire method of the sequential code into a task configured for concurrent execution.

25. The computer accessible medium as recited in claim 23, wherein said generating comprises analyzing the marked code to estimate performance benefits of concurrently executing the marked blocks of code, wherein one of the marked blocks is not transformed into one of the concurrently executable tasks if said analyzing indicates no performance benefit is estimated to result from concurrent execution.

26. The computer accessible medium as recited in claim 25, wherein for one or more of the marked blocks not transformed into one of the concurrently executable tasks due to the analysis, said generating comprises removing markers in the concurrent code.

27. The computer accessible medium as recited in claim 25, wherein said analyzing comprises comparing an estimated execution time of each marked block to an overhead for scheduling concurrent threads.

28. The computer accessible medium as recited in claim 23, wherein the program instructions are further executable to provide an application programming interface (API) for marking the sequential code to suggest one or more blocks of the sequential code for concurrent execution.

29. The computer accessible medium as recited in claim 28, wherein said marking comprises:

receiving the sequential code;

analyzing the sequential code to identify potential concurrently executable blocks of the sequential code; and inserting markers into the sequential code to suggest the identified blocks for concurrent execution.

30. The computer accessible medium as recited in claim 23, wherein the program instructions are further executable to provide an application programming interface (API) for marking one or more blocks of the sequential code with a marker method call to suggest blocks for potential concurrent execution.

31. The computer accessible medium as recited in claim 23, wherein the marked code comprises a marker for each block of code marked for concurrent execution, and wherein said scheduling comprises scheduling one of the tasks for multi-threaded execution according to dependency information included with the marker for the corresponding marked block.

32. The computer accessible medium as recited in claim 23, wherein the program instructions are further executable to implement managing a thread pool to provide threads for multi-threaded execution of the task of the concurrent code, wherein said scheduling comprises requesting a thread from the thread pool for each task scheduled for multi-threaded execution.

33. The computer accessible medium as recited in claim 23, wherein the program instructions are further executable to implement tracking each concurrently executable task, wherein said tracking comprises logging information to trace or profile execution of the tasks.

* * * * *